(12) United States Patent
Bond et al.

(10) Patent No.: US 12,487,145 B2
(45) Date of Patent: Dec. 2, 2025

(54) AUTONOMOUS FIBER OPTIC SYSTEM FOR DIRECT DETECTION OF CO₂ LEAKAGE IN CARBON STORAGE WELLS

(71) Applicant: LAWRENCE LIVERMORE NATIONAL SECURITY, LLC, Livermore, CA (US)

(72) Inventors: Tiziana C. Bond, Livermore, CA (US); Allan Shih-Ping Chang, San Ramon, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 680 days.

(21) Appl. No.: 17/461,309

(22) Filed: Aug. 30, 2021

(65) Prior Publication Data
US 2023/0069606 A1 Mar. 2, 2023

(51) Int. Cl.
*G01M 3/04* (2006.01)
*G01N 33/00* (2006.01)
*G01N 33/24* (2006.01)
*G01M 3/22* (2006.01)
*G01M 3/38* (2006.01)

(52) U.S. Cl.
CPC .......... *G01M 3/047* (2013.01); *G01N 33/004* (2013.01); *G01N 33/246* (2013.01); *G01M 3/226* (2013.01); *G01M 3/38* (2013.01); *Y02C 20/40* (2020.08)

(58) Field of Classification Search
CPC ........ G01M 3/047; G01M 3/226; G01M 3/38; G01N 33/004
See application file for complete search history.

(56) References Cited

U.S. PATENT DOCUMENTS

| 2005/0263281 | A1* | 12/2005 | Lovell | E21B 23/12 166/250.07 |
| 2008/0205837 | A1* | 8/2008 | Gallagher | G01N 21/3504 385/124 |
| 2009/0326826 | A1* | 12/2009 | Hull | E21B 47/103 702/12 |
| 2012/0029835 | A1* | 2/2012 | Xia | G01N 21/0303 385/12 |
| 2016/0252450 | A1* | 9/2016 | Wild | E21B 47/10 356/481 |
| 2017/0328832 | A1* | 11/2017 | Challener | G02B 6/02304 |
| 2022/0403721 | A1* | 12/2022 | Jaaskelainen | E21B 47/114 |
| 2023/0384511 | A1* | 11/2023 | Wheeler | G02B 6/02347 |

FOREIGN PATENT DOCUMENTS

CN 105699327 B * 10/2018 ............. G01N 21/39
WO WO-2017196449 A1 * 11/2017 ............. G01M 3/38

OTHER PUBLICATIONS

Machine Translation of CN 105699327 B (Year: 2018).*
Bond et al., "Distributed chemical sensing for CO2 leakage monitoring," 16th International Conference on Greenhouse Gas Control Technologies, GHGT-16, Oct. 23-27, 2022, Lyon, France, 9 pages.

* cited by examiner

*Primary Examiner* — Nathaniel J Kolb
(74) *Attorney, Agent, or Firm* — Knobbe, Martens, Olson & Bear, LLP

(57) ABSTRACT

Direct detection of carbon dioxide leakage in a carbon storage well is obtained using an optical fiber adapted to be positioned in the carbon storage well, a detection unit operatively connected to the optical fiber, and a leak sensor section incorporated in the optical fiber.

35 Claims, 5 Drawing Sheets

AUTONOMOUS FIBER OPTIC SYSTEM FOR DIRECT DETECTION OF $CO_2$ LEAKAGE IN CARBON STORAGE WELLS

STATEMENT AS TO RIGHTS TO APPLICATIONS MADE UNDER FEDERALLY SPONSORED RESEARCH AND DEVELOPMENT

The This invention was made with Government support under Contract No. DE-AC52-07NA27344 awarded by the United States Department of Energy. The Government has certain rights in the invention.

BACKGROUND

Field of Endeavor

The present disclosure relates to carbon dioxide and more particularly to detection of $CO_2$ leakage in carbon storage wells.

State of Technology

This section provides background information related to the present disclosure which is not necessarily prior art.

Geologic sequestration is the process of injecting carbon dioxide, captured from an industrial (e.g., steel and cement production) or energy-related source (e.g., a power plant or natural gas processing facility), into deep subsurface rock formations for long-term storage. This is part of a process frequently referred to as "carbon capture and storage" or CCS. Well leakage is a long-term concern and extends beyond the end of $CO_2$ injection operations. Current approach used by industry to detect gas leakage is by measuring sustained casing and it is not location specific Current approaches of diagnostic analyses disrupts operations and risks damaging equipment within the well.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

Applicant's apparatus, systems, and methods provide simultaneous, real-time detection of $CO_2$ leakage in carbon storage wells. The apparatus, systems, and methods overcome current roadblocks to using fiber optics for the detection of $CO_2$ in wells by providing direct measurements of the concentration of $CO_2$ (and other gases/fluids), along with other important parameters such as temperature and pressure. Applicant's apparatus, systems, and methods provide direct detection of carbon dioxide leakage in a carbon storage well using an optical fiber adapted to be positioned in the carbon storage well, a detection unit operatively connected to the optical fiber, and a leak sensor section incorporated in the optical fiber. Applicant's apparatus, systems, and methods have multiple uses. For example, Applicant's apparatus, systems, and methods have use in detecting small chronic leaks that have the potential to damage underground sources of drinking water. Applicant's apparatus, systems, and methods also have use in evaluating the expected range of the conditions in a monitoring well. Applicant's apparatus, systems, and methods have use in identifying precursors to low probability/high consequence blow-out events that could be mitigated by fixing the carbon storage well.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serves to explain the principles of the apparatus, systems, and methods.

DETAILED DESCRIPTION OF SPECIFIC EMBODIMENTS

Figure 1:
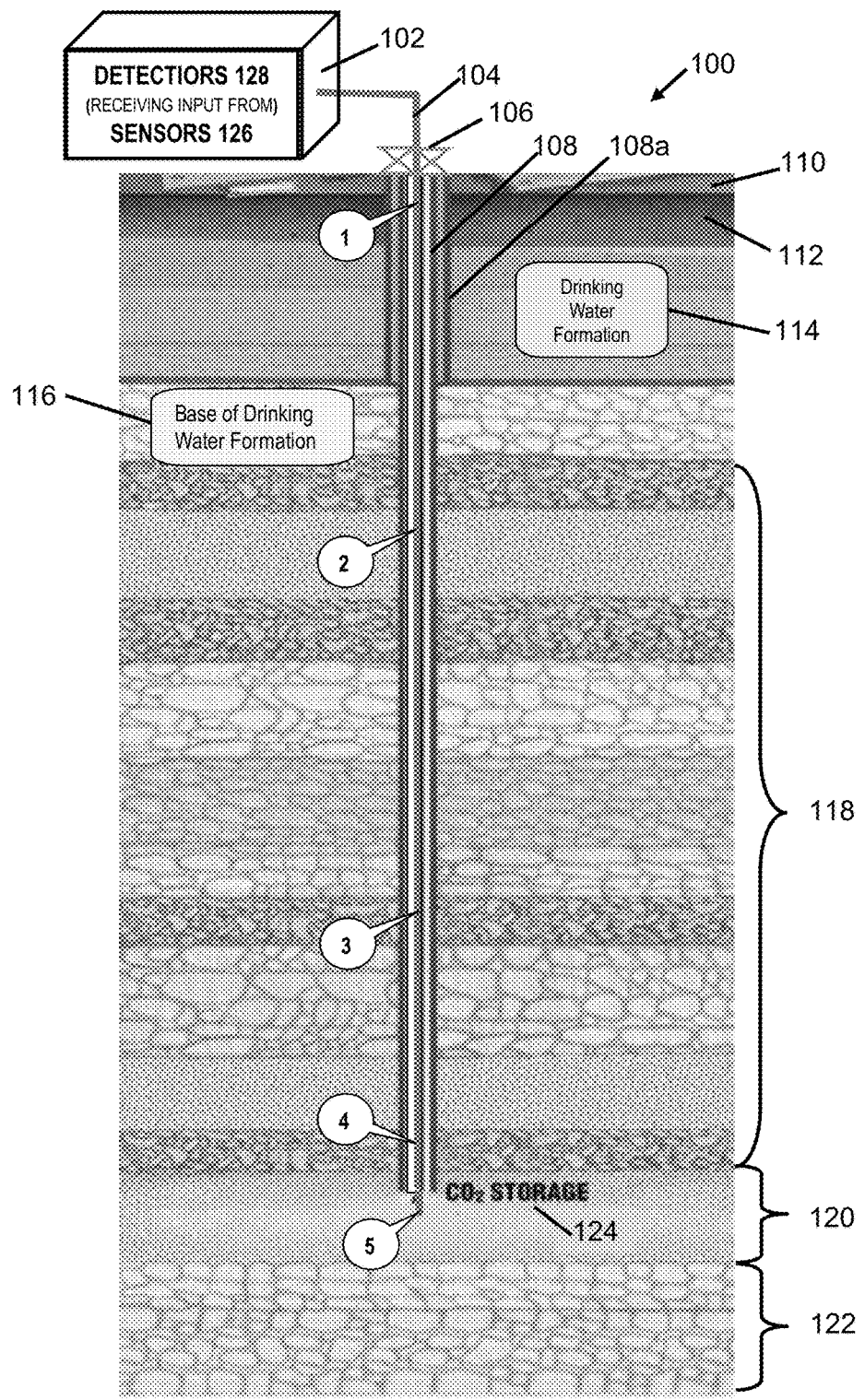
FIG. 1 illustrates one embodiment of Applicant's apparatus, systems, and methods in a carbon storage well.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

The injection and storage of $CO_2$ in deep geologic formations is a potentially feasible strategy to mitigate greenhouse gas emissions. While the purpose of geologic carbon sequestration is to trap $CO_2$ underground, $CO_2$ could migrate away from the storage site into the shallow subsurface and atmosphere if permeable pathways such as well bores or faults are present. Due to the potentially negative impacts of $CO_2$ leakage on the sequestration objective and near-surface environment, it is important that $CO_2$ leakage detection be conducted as an integral part of geologic carbon sequestration. Although a variety of techniques are available to measure near-surface $CO_2$, leakage detection is challenging due to the large variation in natural background $CO_2$ fluxes and concentrations, within which a potentially small $CO_2$ anomaly may be hidden.

Referring now to the drawings and in particular to FIG. 1, one embodiment of the inventors' apparatus, systems, and methods is illustrated. This embodiment is designated generally by the reference numeral 100. The embodiment 100 includes the structural elements and operational stages identified and described below.

Reference numerals 1, 2, 3, 4, and 5—Multiple detection locations (Also other detection locations within the carbon storage well),
Reference numeral 102—Controls, detection & sensing,
Reference numeral 104—Optical fiber,
Reference numeral 106—Well head,
Reference numeral 108—Carbon storage well,
Reference numeral 108a—Casing,
Reference numeral 110—Ground,
Reference numeral 112—Upper geological formation,
Reference numeral 114—Drinking water resources geological formation,
Reference numeral 116—Base of groundwater sources of drinking water geological formation,
Reference numeral 118—Various geological formations,
Reference numeral 120—$CO_2$ storage geological formations,
Reference numeral 122—Geological formations below $CO_2$ storage geological formations,
Reference numeral 124—Stored $CO_2$,
Reference numeral 126—Leak sensor section(s) of optical fiber, and
Reference numeral 128—Detector unit(s).

The structural elements of the inventors' apparatus, systems, and methods 100 having been identified and described the operation of the system 100 will now be considered. A carbon storage well 108 extends from the ground 110 through upper geological formation 112, through water resources geological formation 112, through base of groundwater sources of drinking water geological formation 116, through various other geological formations 118, and into $CO_2$ storage geological formations 120. A casing 108a surrounds the carbon storage well 108 from the ground 110 through upper geological formation 112 through water resources geological formation 112 to the base of groundwater sources of drinking water geological formation 116 to provide full protection of the drinking water formation 114.

An optical fiber 104 extends from the controls, detection & sensing unit 102 (using sensors 126 and detection unit 128) into the carbon storage well 108. The basic components of an optical fiber are a core, a cladding, and a coating. The core is the light transmission area of the optical fiber. The function of the cladding is to provide a lower refractive index at the core interface in order to cause reflection within the core so that light waves are transmitted through the optical fiber. Coatings are usually multi-layers of plastics applied to preserve fiber strength, absorb shock and provide extra fiber protection. A sensor 126 or multiple sensors 126 are included in the optical fiber 104 and used for detection. The sensor 126 in various embodiments includes intermittently embedding segments with Fiber Bragg Gratings (FBG) which can be located at any position within the carbon storage well 108. By way of example, the sensor portion 126 of the optical fiber 104 is illustrated as being positioned at the identified locations 1, 2, 3, 4, and 5 within the carbon storage well 108. The sensor portion 126 of the optical fiber 104 can be positioned at other locations within the carbon storage well 108. The sensor 126 in some embodiments does not include Bragg gratings. The sensor portion 126 embodiment without Bragg gratings is preferably located at the end of the optical fiber 104 in the operation of sensing and detection of carbon dioxide leakage in the carbon storage well 108.

The inventors' apparatus, systems, and methods provide various combinations of solid core, hollow core, and FBG fiber segments along the carbon storage well 108. In the embodiments with FBG fiber segments the Bragg gratings are there to help with the signal. The combination of Bragg gratings with the hollow core fiber provides backreflection and allows for light to have one more pass in the hollow core fiber and interact with the gas before reaching the controls, detection & sensing unit 102 using sensors 126 and detection unit 128. The detection unit 128 can include a spectrometer for Raman spectroscopy, a detector for IR absorption spectroscopy, or an optical spectrum analyzer or combination of them. The embodiment illustrated in FIG. 1 will be operating in reflection mode when all the apparatuses are on top of the well and the FBG will have a Bragg wavelength aligned with the absorption line of the gas introduced in the fiber (for instance 1573 nm for $CO_2$). The embodiment without Bragg gratings can be operated in transmission mode with-out the FBGs; however, the sensor section will be at the bottom of fiber section and the information will be relayed back to the controls, detection & sensing unit on top of the well.

Some of the benefits of Applicant's apparatus, systems, and methods are: no electrical components underground, multi-functional, multi-locations in an integrated system, scalable, sensitive and selective, multiplexable (multiple fiber bundles, colors) and savings in cost, increased efficiency, improved modeling and mitigation of environmental impact. Various embodiments of Applicant's apparatus, systems, and methods 100 utilize intermittently embedding segments of Slotted Holey Fibers (S-HoFs) to allow for IR/Raman spectroscopy (chemical fingerprinting) and Fiber Bragg Gratings (FBGs) for optical time-domain reflectometry and/or wavelength shift (with sensitive coatings) on return signal from the sensor segments.

Further details of Applicant's apparatus, systems, and methods are provided by a number of illustrations of examples of the sensor portion of the optical fiber.

Figure 2:
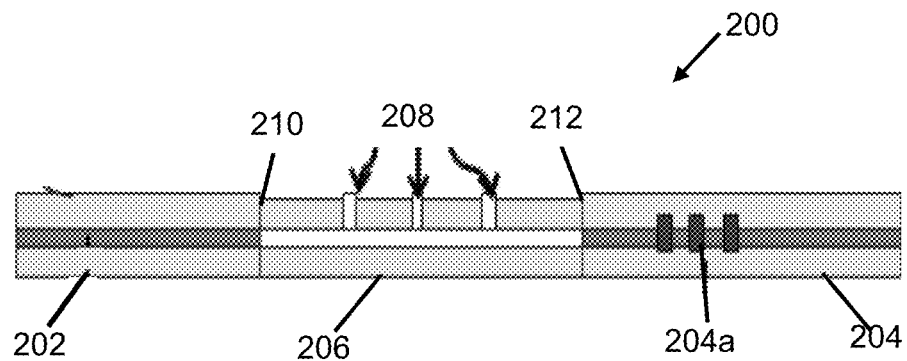
FIG. 2 illustrates one example of the sensor portion of the optical fiber.

Referring to FIG. 2 an illustrative depiction shows details of one example of the sensor portion 126 of the optical fiber 104 illustrated in FIG. 1. This depiction is designated generally by the reference numeral 200. FIG. 2 includes the structural elements identified and described below.

Reference numeral 202—Standard solid core fiber,
Reference numeral 204—Bragg gratings section,
Reference numeral 204a—Embedded Bragg gratings,
Reference numeral 206—Hollow core section located between standard solid core fiber 202 and Bragg gratings section 204,
Reference numeral 208—Slots or open windows in hollow core section,
Reference numeral 210—Fused splice between standard solid core fiber 202 and hollow core section 206, and
Reference numeral 212—Fused splice between hollow core section 206 and Bragg gratings section 204.

Figure 3:
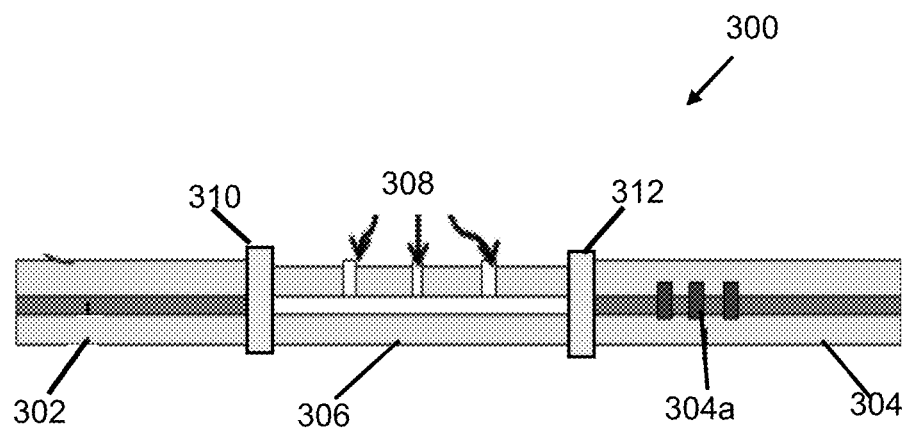
FIG. 3 illustrates another example of the sensor portion of the optical fiber.

Referring now to FIG. 3 an illustrative depiction shows details of another embodiment of the sensor portion of the optical fiber illustrated in FIG. 1. This depiction is designated generally by the reference numeral 300. FIG. 3 includes the structural elements identified and described below.

Reference numeral 302—Standard solid core fiber,
    Reference numeral 304—Bragg gratings section,
    Reference numeral 304a—Embedded Bragg gratings,
    Reference numeral 306—Hollow core section,
    Reference numeral 308—Slots or open windows in hollow core section,
    Reference numeral 310—Junction collar or mating sleeve splice between standard solid core fiber 302 and hollow core section 306, and
    Reference numeral 312—Junction collar or mating sleeve splice between hollow core section 306 and Bragg gratings section 304.

Figure 4:
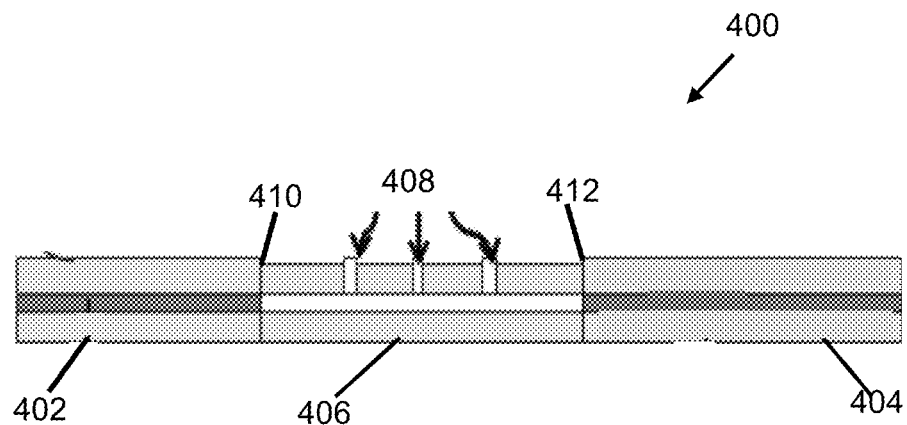
FIG. 4 illustrates yet another example of the sensor portion of the optical fiber.

Referring to FIG. 4 an illustrative depiction shows details of another example of the sensor portion 126 of the optical fiber 104 illustrated in FIG. 1. This depiction is designated generally by the reference numeral 400. FIG. 4 includes the structural elements identified and described below.

Reference numeral 404—Standard solid core fiber,
    Reference numeral 404—Section without Bragg gratings,
    Reference numeral 406—Hollow core section located between standard solid core fiber 404 and Section without Bragg gratings 404,
    Reference numeral 408—Slots or open windows in hollow core section,
    Reference numeral 410—Fused splice between standard solid core fiber 404 and hollow core section 406, and
    Reference numeral 414—Fused splice between hollow core section 406 and Section without Bragg gratings 404.

Figure 5:
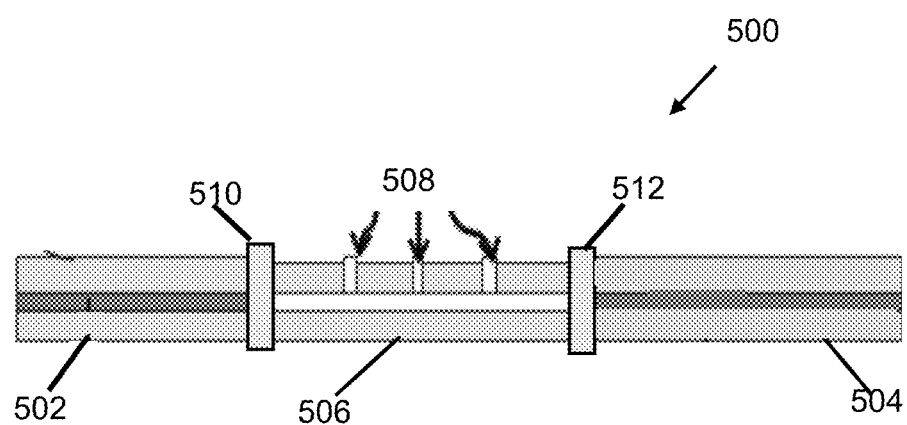
FIG. 5 illustrates another example of the sensor portion of the optical fiber.

Referring to FIG. 5 an illustrative depiction shows details of another example of the sensor portion 126 of the optical fiber 104 illustrated in FIG. 1. This depiction is designated generally by the reference numeral 500. FIG. 5 includes the structural elements identified and described below.

Reference numeral 504—Standard solid core fiber,
    Reference numeral 504—Section without Bragg gratings,
    Reference numeral 506—Hollow core section located between standard solid core fiber 504 and Section without Bragg gratings 504,
    Reference numeral 508—Slots or open windows in hollow core section,
    Reference numeral 510—Junction collar or mating sleeve splice between standard solid core fiber 502 and hollow core section 506, and
    Reference numeral 514—Junction collar or mating sleeve splice between hollow core section 506 and Section without Bragg gratings 504.

Figure 6:
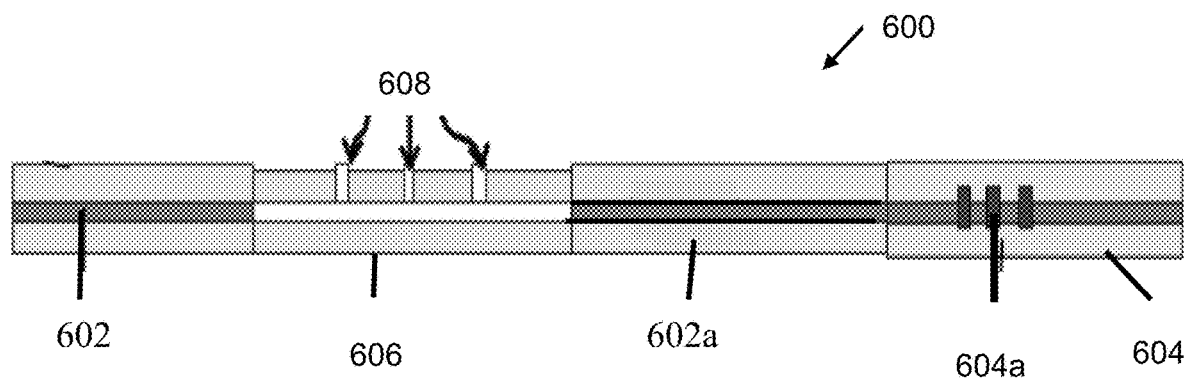
FIG. 6 illustrates another example of the sensor portion of the optical fiber.

Referring to FIG. 6 an illustrative depiction shows details of another example of the sensor portion 126 of the optical fiber 104 illustrated in FIG. 1. This depiction is designated generally by the reference numeral 600. FIG. 6 includes the structural elements identified and described below.

Reference numeral 602—Standard solid core fiber,
    Reference numeral 602a—Standard solid core fiber,
    Reference numeral 604—Bragg gratings section,
    Reference numeral 604a—Embedded Bragg gratings,
    Reference numeral 606—Hollow core section, and
    Reference numeral 608—Slots or open windows in hollow core section.

Figure 7:
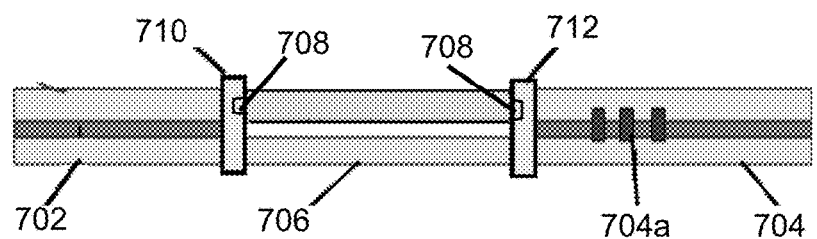
FIG. 7 illustrates another example of the sensor portion of the optical fiber.

Referring now to FIG. 7 an illustrative depiction shows details of another embodiment of the sensor portion of the optical fiber illustrated in FIG. 1. This depiction is designated generally by the reference numeral 700. FIG. 7 includes the structural elements identified and described below.

Reference numeral 702—Standard solid core fiber,
    Reference numeral 704—Bragg gratings section,
    Reference numeral 704a—Embedded Bragg gratings,
    Reference numeral 706—Hollow core section,
    Reference numeral 708—Slots in junction collars 710 and 712,
    Reference numeral 710—Junction collar splice between standard solid core fiber 702 and hollow core section 706, and
    Reference numeral 712—Junction collar splice between hollow core section 706 and Bragg gratings section 704.

Figure 8:
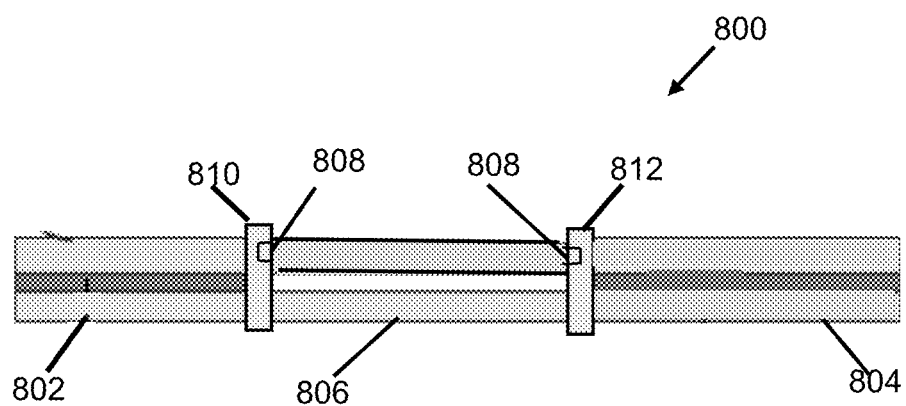
FIG. 8 illustrates another example of the sensor portion of the optical fiber.

Referring to FIG. 8 an illustrative depiction shows details of another example of the sensor portion 126 of the optical fiber 104 illustrated in FIG. 1. This depiction is designated generally by the reference numeral 800. FIG. 8 includes the structural elements identified and described below.

Reference numeral 804—Standard solid core fiber,
    Reference numeral 804—Section without Bragg gratings,
    Reference numeral 806—Hollow core section located between standard solid core fiber 804 and Section without Bragg gratings 804,
    Reference numeral 808—Slots in junction collars 810 and 812,
    Reference numeral 810—Junction collar sleeve splice between standard solid core fiber 802 and hollow core section 806, and
    Reference numeral 814—Junction collar splice between hollow core section 806 and Section without Bragg gratings 804.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. An apparatus for detection of carbon dioxide gas leakage in a carbon storage well, comprising:

optical fiber adapted to be positioned in the carbon storage well, a detection unit operatively connected to the optical fiber, and a plurality of leak sensor sections incorporated in the optical fiber, said optical fiber comprising solid core portions and hollow core portions, a first of said leak sensor sections comprising a first of said hollow core portions and a first grating in said optical fiber and a second of said leak sensor sections comprising a second of said hollow core portions and a second grating in said optical fiber, wherein the first of said leak sensor sections includes at least one opening in the first of said hollow core portions or in a first junction between the first of said hollow core portions and a first of the solid core portions, wherein said first and second gratings are configured to provide back reflection in a reverse direction along said optical fiber toward the detection unit, said first and second gratings reflecting wavelengths of light that interact with carbon dioxide gas to provide measurable absorption or Raman spectroscopy signals sensitive to the presence of said gas, the concentration of said gas or both the presence and the concentration of said gas.

2. The apparatus of claim 1, wherein said first grating is in one of said solid core portions and wherein said at least one opening is located in said first of said hollow core portions proximate said first grating.

3. The apparatus of claim 2, wherein said at least one opening comprises a plurality of openings.

4. The apparatus of claim 1, wherein said detection unit comprises a Raman spectroscopy detection unit.

5. The apparatus of claim 1, wherein said detection unit comprises an IR spectroscopy detection unit.

6. The apparatus of claim 1, wherein at least one of said plurality of leak sensor sections comprises a temperature sensor, a pressure sensor or a chemical sensor.

7. The apparatus of claim 1, wherein the first grating is in said one of said solid core portions.

8. The apparatus of claim 1, wherein the at least one opening is located in a junction collar between the first of said hollow core portions and the first of said solid core portions.

9. The apparatus of claim 1, wherein the detection unit and plurality of leak sensor sections are configured to detect a concentration of the gas.

10. The apparatus of claim 1, wherein said first and second gratings comprise Bragg gratings.

11. The apparatus of claim 1, wherein said optical fiber comprises hollow core portions of optical fiber operatively connected to solid core portions of optical fiber, the second of said leak sensor sections including at least one opening in the second of said hollow core portions or in a second junction between the second of said hollow core portions and a second of the solid core portions.

12. A method of detecting a gas, the method comprising:
providing optical fiber, the optical fiber comprising solid core portions and hollow core portions, a plurality of leak sensor sections incorporated in the optical fiber, a first of said leak sensor sections comprising a first of said hollow core portions and a first grating in said optical fiber and a second of said leak sensor sections comprising a second of said hollow core portions and a second grating in said optical fiber, wherein the first of said leak sensor sections includes at least one opening in the first of said hollow core portions or in a first junction between the first of said hollow core portions and a first of the solid core portions, providing a detection unit operatively connected to said optical fiber, and detecting a gas within the optical fiber, wherein said first and second gratings are configured to provide back reflection in a reverse direction along said optical fiber toward the detection unit, said first and second gratings reflecting wavelengths of light that interact with carbon dioxide gas to provide a measurable absorption or Raman spectroscopy signal sensitive to the presence of said gas, the concentration of said gas or both the presence and the concentration of said gas.

13. The method of claim 12, wherein said providing said leak sensor sections comprises providing said leak sensor sections with said first grating in said first of said solid core portions and said at least one opening located in said first of said hollow core portions proximate said first grating.

14. The method of claim 12, wherein said at least one opening comprises a plurality of openings.

15. The method of claim 12, wherein said optical fiber includes hollow optical fiber providing the first of said hollow core portions and said detection unit is a Raman spectroscopy detection unit or an IR spectroscopy detection unit.

16. The method of claim 12, wherein said detection unit is a Raman spectroscopy detection unit.

17. The method of claim 12, wherein said detection unit is an IR spectroscopy detection unit.

18. The method of claim 12, wherein said providing a detection unit comprises providing a detection unit for multipoint temperature, pressure, and chemical monitoring.

19. The method of claim 12, wherein said providing a detection unit comprises providing a detection unit for temperature sensing.

20. The method of claim 12, wherein said providing a detection unit comprises providing a detection unit for pressure detection.

21. The method of claim 12, wherein said providing a detection unit comprises providing a detection unit for chemical monitoring.

22. The method of claim 12, wherein detecting a gas comprises detecting a concentration of the gas.

23. The method of claim 12, wherein said optical fiber comprises hollow core portions of optical fiber coupled to solid core portions of optical fiber, the second of said leak sensor sections including at least one opening in the second of said hollow core portions or in a second junction between the second of said hollow core portions and a second of the solid core portions.

24. An apparatus configured to detect a gas, the apparatus comprising:
optical fiber comprising solid core portions and hollow core portions, a detection unit operatively connected to said optical fiber, wherein said detection unit is configured to detect a gas within the optical fiber, and a plurality of leak sensing sections in said optical fiber, said plurality of leak sensing sections comprising a first of said leak sensing sections comprising a first of said hollow core portions and a first grating in said optical fiber and a second of said leak sensing sections comprising a second of said hollow core portions and a second grating in said optical fiber, said first and second gratings configured to provide back reflection in the reverse direction along said optical fiber toward the detection unit, said first of said leak sensing sections including at least one opening located in said first of said hollow core portions or in a first junction between the first of said hollow core portions and a first of the solid core portions.

25. The apparatus of claim 24, wherein said optical fiber comprises hollow core portions of optical fiber optically coupled to solid core portions of optical fiber, the second of said leak sensor sections including at least one opening in the second of said hollow core portions or in a second junction between the second of said hollow core portions and a second of the solid core portions.

26. The apparatus of claim 24, wherein said detection unit is a Raman spectroscopy detection unit.

27. The apparatus of claim 24, wherein said detection unit is an IR spectroscopy detection unit.

28. The apparatus of claim 24, wherein said first of said leak sensing sections comprises a sensor for multipoint temperature, pressure, and chemical monitoring.

29. The apparatus of claim 24, wherein said first of said leak sensing sections comprises a temperature sensor.

30. The apparatus of claim 24, wherein said first of said leak sensing sections comprises a pressure sensor.

31. The apparatus of claim 24, wherein said first of said leak sensing sections comprises a sensor for chemical monitoring.

32. The apparatus of claim 24, wherein the first grating is in one of said solid core portions.

33. The apparatus of claim 24, wherein the at least one opening is located in said first junction between the first of said hollow core portions and the first of said solid core portions.

34. The apparatus of claim 24, wherein the detection unit and leak sensing sections are configured to detect a concentration of the gas.

35. The apparatus of claim 24, wherein said first and second gratings comprise Bragg gratings.

* * * * *